United States Patent
Nakajima

(10) Patent No.: US 8,937,587 B2
(45) Date of Patent: Jan. 20, 2015

(54) TEMPERATURE ESTIMATING APPARATUS, METHOD FOR CONTROLLING THE SAME, AND IMAGE DISPLAY APPARATUS

(75) Inventor: Tatsuya Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 297 days.

(21) Appl. No.: 13/450,145

(22) Filed: Apr. 18, 2012

(65) Prior Publication Data

US 2012/0274544 A1 Nov. 1, 2012

(30) Foreign Application Priority Data

Apr. 26, 2011 (JP) ................................. 2011-098657
Feb. 24, 2012 (JP) ................................. 2012-038827

(51) Int. Cl.
G09G 3/36 (2006.01)
G01K 7/42 (2006.01)
G09G 3/34 (2006.01)
H05B 33/08 (2006.01)

(52) U.S. Cl.
CPC *G01K 7/42* (2013.01); *G09G 3/342* (2013.01); *H05B 33/0854* (2013.01); *H05B 33/0872* (2013.01); *G09G 2320/041* (2013.01); *G09G 2320/0646* (2013.01)
USPC ........................................................ 345/102

(58) Field of Classification Search
USPC ........................................................ 345/102
See application file for complete search history.

(56) References Cited

U.S. PATENT DOCUMENTS

2009/0021178 A1* 1/2009 Furukawa et al. ............. 315/250
2010/0302133 A1* 12/2010 Liang et al. ................... 345/102

FOREIGN PATENT DOCUMENTS

| JP | 2007-165632 | 6/2007 |
| JP | 2007-240666 | 9/2007 |
| JP | 2009-042651 | 2/2009 |
| JP | 2009-042652 | 2/2009 |

* cited by examiner

*Primary Examiner* — Chanh Nguyen
*Assistant Examiner* — Roy Rabindranath
(74) *Attorney, Agent, or Firm* — Cowan, Liebowitz & Latman, P.C.

(57) ABSTRACT

A temperature estimating apparatus, which is provided for a backlight having a plurality of light source blocks each having one light source or a plurality of light sources so that light emission of the light source of each of the light source blocks can be regulated independently, comprises an acquiring unit which acquires a luminance of the light source for each of the light source blocks; a temperature sensor which measures a temperature of at least any one of an internal and external temperature of a casing of the image display apparatus having the backlight; and an estimating unit which estimates a temperature of the light source for each of the light source blocks on the basis of a measured value obtained by the temperature sensor and a luminance value of the light source of each of the light source blocks acquired by the acquiring unit.

9 Claims, 9 Drawing Sheets

TEMPERATURE ESTIMATING APPARATUS, METHOD FOR CONTROLLING THE SAME, AND IMAGE DISPLAY APPARATUS

BACKGROUND OF THE INVENTION

1. Field of the Invention

The present invention relates to a temperature estimating apparatus, a method for controlling the same, and an image display apparatus.

2. Description of the Related Art

In recent years, the local dimming (partial dimming or extinction) control is available as a control method for controlling a backlight which radiates the light onto a back surface of a liquid crystal panel of a liquid crystal display apparatus (LCD: Liquid Crystal Display). In the local dimming control, the backlight is divided into a plurality of light source blocks, and the luminance is controlled for each of the light source blocks depending on an input image. Accordingly, the contrast is enhanced, and the electric power consumption is suppressed.

LED (Light Emitting Diode), in which the electric power consumption is decreased and the high control response speed is obtained, is used in some cases as a light source of the backlight in order to realize the local dimming control. Further, in order that the luminance can be controlled partially or locally, the backlight is constructed in some cases by a plurality of LEDs, and the LEDs are divided into a plurality of light source blocks for which the luminance can be controlled independently.

In general, in the case of LED, the luminance and the wavelength of the light emission are changed depending on the temperature. The amount of change differs depending on the light emission color (red, green, blue). Further, the time-dependent change differs depending on each of the light emission colors.

For example, in the case of Japanese Patent Application Laid-open Nos. 2009-42651 and 2009-42652, the change of the light emission is detected by using a temperature sensor for LED and/or a color sensor for detecting the color balance so that the correction control is performed in order to provide the stable display. In the case of a display apparatus described in Japanese Patent Application Laid-open No. 2007-165632, such a method is also suggested that the ambient temperature of LED and the voltage between terminals are detected respectively to estimate the temperature of LED. In the case of a display apparatus described in Japanese Patent Application Laid-open No. 2007-240666, such a method is also suggested that the internal temperature of the display apparatus and the temperature of a part or parts are estimated without using any temperature sensor.

SUMMARY OF THE INVENTION

However, in the case of the conventional techniques described in Japanese Patent Application Laid-open Nos. 2009-42651, 2009-42652, and 2007-165632 described above, when the local dimming control, in which the luminance of LED is changed partially or locally, is performed, it is necessary that the temperature sensor, the optical sensor, and the means for detecting the voltage between terminals of LED should be provided for each of the light source blocks as the unit of control in order to detect the temperature of LED. Therefore, when it is intended to carry out the fine control by increasing the number of divisions of the light source blocks in the local dimming control, then the numbers of the respective detecting means are increased, and the cost and the handling or management affairs concerning wiring lines for the respective sensors are increased.

In the case of the conventional technique described in Japanese Patent Application Laid-open No. 2007-240666 described above, the driving current of the backlight is measured in order to correct a crystal oscillator so that the temperature in a casing and the temperature of a part are estimated. However, there is no description in relation to the estimation of the temperatures of respective LEDs of a plurality of light source blocks.

The present invention provides a technique for estimating the temperature of each of light source blocks of a backlight constructed by a plurality of the light source blocks while suppressing the increase in the cost and the number of installed sensors.

A first aspect of the present invention resides in a temperature estimating apparatus for a backlight which is comparted into a plurality of light source blocks each having one light source or a plurality of light sources and in which light emission of the light source of each of the light source blocks can be regulated independently; the temperature estimating apparatus comprising acquiring unit which acquires a luminance of the light source for each of the light source blocks; a temperature sensor which measures a temperature of at least any one of an internal temperature of a casing and an external temperature of the casing of the image display apparatus having the backlight; and estimating unit which estimates a temperature of the light source for each of the light source blocks on the basis of a measured value obtained by the temperature sensor and a luminance value of the light source of each of the light source blocks acquired by the acquiring unit.

A second aspect of the present invention resides in a method for controlling a temperature estimating apparatus for a backlight which is comparted into a plurality of light source blocks each having one light source or a plurality of light sources and in which light emission of the light source of each of the light source blocks can be regulated independently; the method comprising an acquiring step of acquiring a luminance of the light source for each of the light source blocks; a step of acquiring a measured value from a temperature sensor which measures a temperature of at least any one of an internal temperature of a casing and an external temperature of the casing of the image display apparatus having the backlight; and an estimating step of estimating a temperature of the light source for each of the light source blocks on the basis of the measured value obtained by the temperature sensor and a luminance value of the light source of each of the light source blocks acquired in the acquiring step.

According to the present invention, it is possible to estimate the temperature of each of the light source blocks of the backlight constructed by the plurality of light source blocks while suppressing the increase in the cost and the number of installed sensors.

Further features of the present invention will become apparent from the following description of exemplary embodiments with reference to the attached drawings.

DESCRIPTION OF THE EMBODIMENTS

First Embodiment

Figure 1:
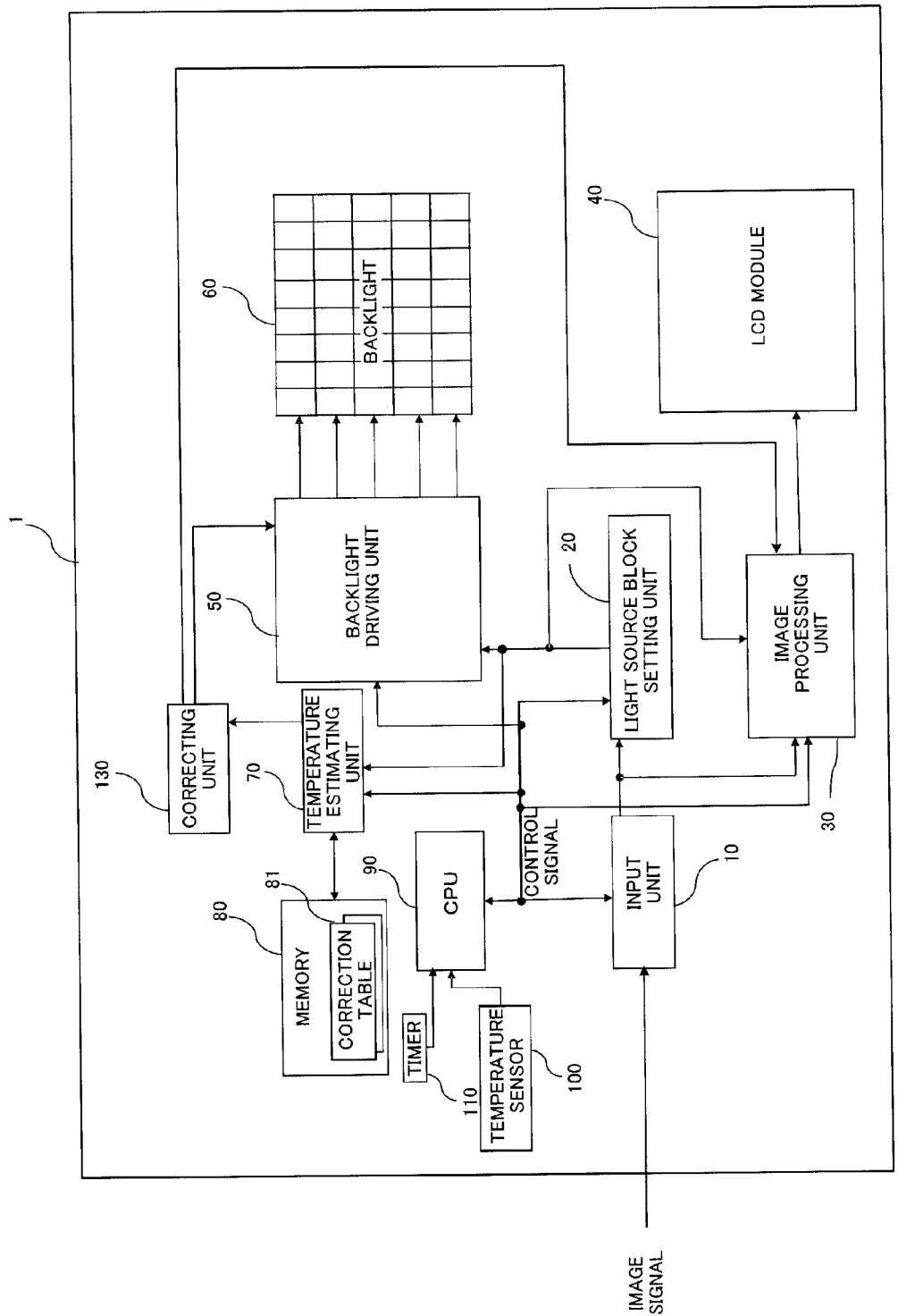
FIG. 1 shows an entire arrangement of a liquid crystal display apparatus of a first embodiment.

An embodiment for carrying out the present invention will be specifically explained below with reference to the drawings. FIG. 1 shows an arrangement of a liquid crystal display apparatus 1 according to a first embodiment of the present invention.

An image signal in the frame unit, which is inputted into a liquid crystal display apparatus 1 from the outside, is converted by an input unit 10 into image data in the frame unit so that the data can be delivered to a light source block setting unit 20 and an image processing unit 30 disposed at the downstream stage. For example, when the image signal is an analog signal, the input unit 10 converts the analog image signal to the digital signal by using an A-D converter (Analog-to-Digital Converter). The input unit 10 performs the conversion into the image data of the 8 bit binary gradation signal of the three primary colors of red, green, and blue as filter colors of an LCD module 40, the horizontal synchronization signal, the vertical synchronization signal, and the enable signal to indicate the presence or absence of the data. When the image signal is a digital signal, the input unit 10 performs the conversion such that the inputted image signal is rearranged into the image data of the 8 bit binary gradation signal of the three primary colors of red, green, and blue as the filter colors of the LCD module 40, the horizontal synchronization signal, the vertical synchronization signal, and the enable signal to indicate the presence or absence of the data.

The light source block setting unit 20 prepares the light source block control data to represent the preset values of the luminances of respective light source blocks of a backlight 60 on the basis of the image data supplied from the input unit 10, and the light source block control data is sent to the image processing unit 30, a backlight driving unit 50, and a temperature estimating unit 70.

The image processing unit 30 corrects the gradation levels of the image data supplied from the input unit 10 on the basis of the light source block control data supplied from the light source block setting unit 20 to generate the corrected image data which is sent to the LCD module 40. The LCD module 40 is controlled in accordance with the corrected image data.

The LCD module 40 is a liquid crystal panel which is driven in accordance with the active matrix system of the TFT (Thin Film Transistor) type or the like. The LCD module 40 has electrodes which are arranged in the row direction and the column direction, and the pixels are arranged at the points of intersection therebetween. Accordingly, the plurality of pixels are arranged in a matrix form in this arrangement. The LCD module 40 displays the image by regulating the transmittances of the respective pixels arranged in the matrix form so that the pixel, which is disposed at the designated position and which has the designated color, has the luminance which is the luminance corresponding to the designated gradation level, on the basis of the corrected image data inputted from the image processing unit 30.

The backlight driving unit 50 sets the luminances of the respective light source blocks of the backlight 60 on the basis of the light source block control data supplied from the light source block setting unit 20, and LED of the backlight 60 is subjected to the light emission for each of the light source blocks.

The backlight 60 is comparted into a plurality of light source blocks each of which has one light source or a plurality of light sources. As for the light sources of the respective light source blocks, the light emission can be regulated independently. The backlight driving unit 50 performs the local dimming control by controlling the luminance for each of the light source blocks of the backlight 60. Each of the light source blocks is composed of a plurality of LEDs, and the light source block is adjusted so that the light emission is effected in the white color. For example, each of the light source blocks is composed of one or more white LED or LEDs or a combination of one or more set or sets of LEDs having the three types of light emission colors of red, green, and blue. The light emission from LED of the backlight 60 radiates the LCD module 40. The light is transmitted through the LCD module 40 at the transmittance corresponding to the gradation level of each of the pixels of the LCD module 40. Accordingly, the image display is obtained on the basis of the luminance of LED and the image data.

The temperature estimating unit 70 estimates the temperature of LED of the backlight 60 for each of the light source blocks by using the light source block control data supplied from the light source block setting unit 20 and a correction table 81 stored in a memory 80.

CPU 90 is CPU (Central Processing Unit) which controls the operation of the liquid crystal display apparatus 1. CPU 90 performs the monitoring of the states of other functional units and the setting of the parameters required to control the operation. Further, CPU 90 acquires the measured value of the temperature from a temperature sensor 100. The information of the measured value of the temperature is used to correct the data of the temperature estimating unit 70. Additionally, CPU 90 acquires the information of the time (point or moment of time) from a timer 110. The information of the time is used in order that the temperature estimating unit 70 stores, in the memory 80, the information of the time and the estimated value of the temperature of LED in the light source block unit.

The temperature sensor 100 is composed of a semiconductor or a thermocouple. The temperature sensor 100 is installed so that the temperature can be measured for one or both of the external portion of the casing and the internal portion of the casing of the liquid crystal display apparatus 1. This embodiment is illustrative of an exemplary case in which the temperature sensor 100 is installed at the external portion (outside) of the casing (for example, the temperature sensor 100 is installed while being embedded in a front cover or a back cover).

Next, an explanation will be made with reference to the drawings about the detailed flow of the operation. The following explanation will be made as exemplified by such an exemplary case that an image signal of a landscape image composed of a sun image, a sky image, and a ground image as shown in FIG. 2 is inputted into the liquid crystal display apparatus 1.

Figure 2:
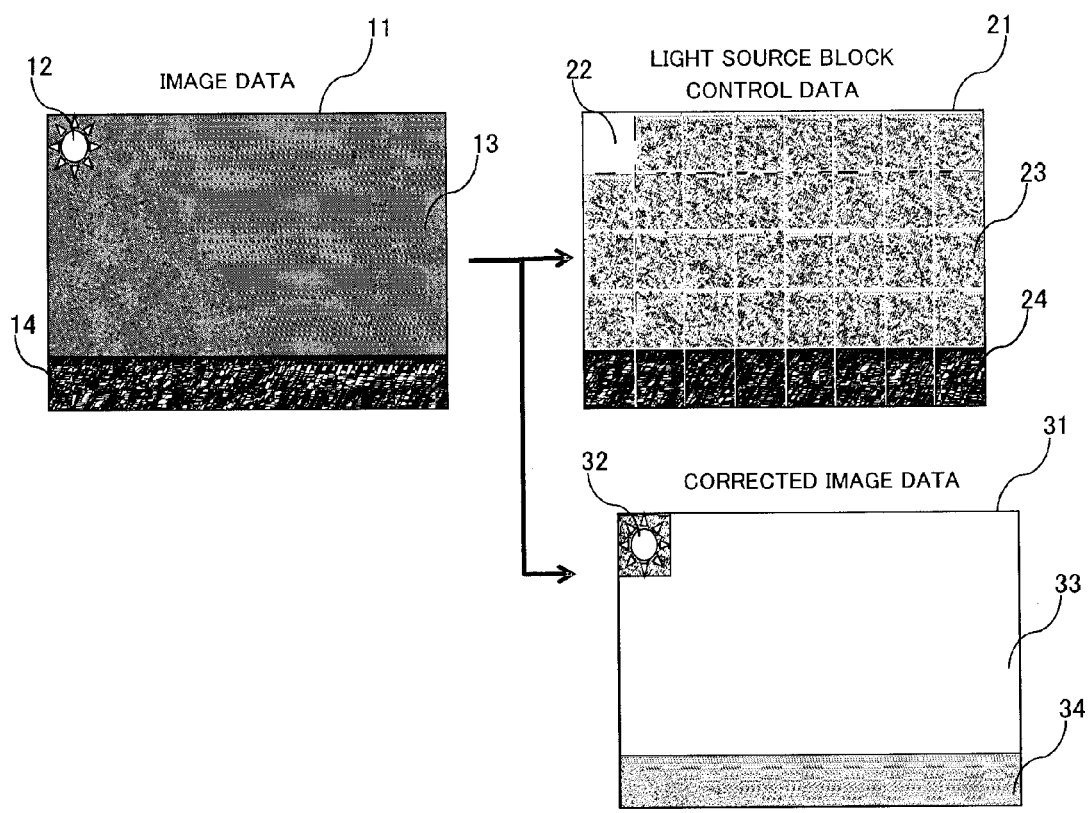
FIG. 2 conceptually shows the image processing.

FIG. 2 conceptually shows the image data of 1 frame of the image signal received by the input unit 10, the light source block control data prepared by the light source block setting unit 20, and the corrected image data prepared by the image processing unit 30. The luminance of the display image in the LCD module 40 is determined by the gradation level of the corrected image data and the luminance of each of the light source blocks of the backlight 60. The image processing unit 30 also performs a weighting process on the basis of the luminance levels of the light source blocks adjacent to the light source block corresponding to the concerning pixel depending on the coordinates (position) of the pixel disposed in the vicinity of the boundary as the objective in order to reduce the difference in luminance at the boundary between the light source blocks. However, any explanation thereof is omitted herein.

The following process is carried out for each of the inputted frames. With reference to FIG. 2, the image data 11 includes the sun image 12, the blue sky image 13, and the ground image 14. An explanation will be made about the process in which the corrected image data 31 and the light source block control data 21 are prepared on the basis of the image data.

The light source block setting unit 20 determines the maximum gradation levels of the red color, the green color, and the blue color of the image data for each of the areas corresponding to each of the light source blocks of the backlight 60, in relation to the image data 11. In the example shown in FIG. 2, it is assumed that the maximum gradation level of the portion of the sun image 12 is 255, the maximum gradation level of the portion of the sky image 13 is 184, and the maximum gradation level of the portion of the ground image 14 is 104 in relation to the respective parts of the image data 11.

Figure 3:
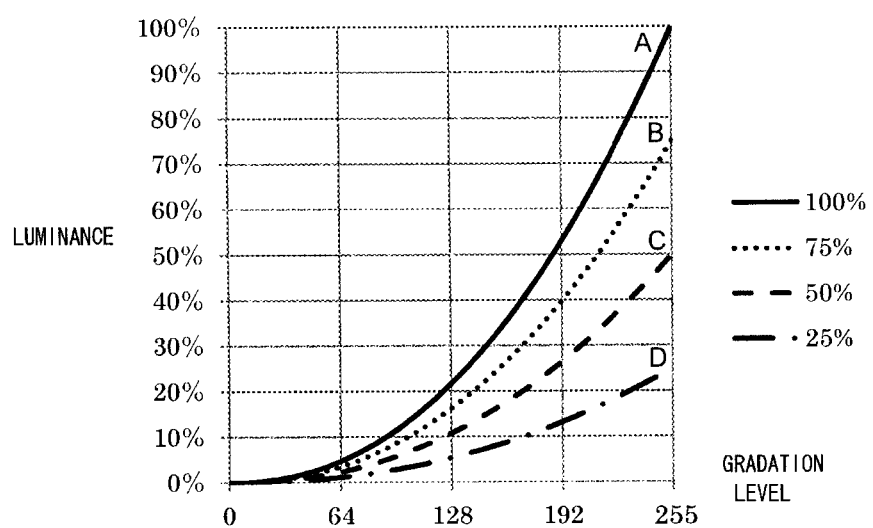
FIG. 3 shows a table illustrating the relationship between the gradation level of image data and the luminance.

Subsequently, the light source block setting unit 20 calculates the luminance of each of the light source blocks of the backlight 60 corresponding to the determined maximum gradation level. The relationship between the gradation level of the inputted image data and the luminance corresponding thereto is shown by Solid line A in FIG. 3. The vertical axis of FIG. 3 represents the relative luminance in which the input gradation level of the LCD module 40 is the maximum gradation level (255 in the case of 8 bit) and the luminance, which is obtained when the backlight 60 provides the maximum luminance, is 100%. The horizontal axis of FIG. 3 represents the input gradation level of the LCD module 40, which indicates values ranging from 0 to 255 in the case of 8 bit. Lines B, C, D shown in FIG. 3 will be described later on.

In general, in the case of the display apparatus, the relationship between the input gradation level and the luminance is not proportional, and the relationship has the so-called gamma characteristic. In the LCD module 40, the input gradation level and the luminance have a relationship raised to the power of 2.2. The expression, which is usable to calculate the luminance from the gradation level of the image data, is represented by Expression 1 as follows.

Luminance=(gradation level of image data/255)$^{2.2}$ (Expression 1)

In the example of the image data 11 shown in FIG. 2, the luminance required to display each of the portions is as follows. That is, the portion of the sun image 12 has the maximum gradation level of 255, and hence the required luminance is 100%. The portion of the sky image 13 has the maximum gradation level of 184, and hence the required luminance is 48%. The portion of the ground image 14 has the maximum gradation level of 104, and hence the required luminance is 14%. The sky image is also present as the background image at the portion of the sun image 12 other than the sun image. The luminance, which is required to display such a portion, is the luminance corresponding to the maximum gradation level at the concerning portion.

It is assumed that the luminance of each of the light source blocks for constructing the backlight 60 can be set independently for each of the light source blocks to any one of the luminances at 4 levels (25%, 50%, 75%, and 100%) obtained by the division into quarters. For example, the luminance at each of the levels and the number of luminance levels for which each of the light source blocks can be regulated are not limited thereto. In FIG. 3, the four types of lines A, B, C, and D represent the relationships between the input gradation level and the luminance when the luminances of the respective light source blocks of the backlight Hare set to the respective levels of the foregoing 4 levels by the backlight driving unit 50. In the case of the ordinary liquid crystal display, the luminance level is actually not 0, because the leakage light is provided, for example, from the adjoining light source blocks, even when the image, which corresponds to a certain light source block, has the gradation level of 0. The luminance level ratio at each of the gradation levels is equal to one another in relation to the four types of lines A, B, C, and D.

Subsequently, the light source block setting unit 20 selects the luminance level of each of the light source blocks of the backlight 60 from the four levels in order to prepare the light source block control data 21. In this case, it is assumed that the luminance of each of the light source blocks of the backlight 60 can be regulated to any one of the luminances at the four levels. The light source block setting unit 20 determines the luminance level of each of the light source blocks depending on the luminance required to display each of the portions of the image data 11 determined as described above. Specifically, the light source block setting unit 20 selects the minimum luminance level which is not less than the luminance required to display the concerning portion, as the luminance level of the light source block corresponding to each of the portions of the image data 11.

In the example shown in FIG. 2, the luminance, which is required to display the portion of the sun image 12, is 100%, and hence the luminance level of the light source block 22 disposed at the position corresponding to the portion of the sun image 12 is 100% (Line A shown in FIG. 3). The luminance, which is required to display the portion of the sky image 13, is 48%, and hence the luminance level of the light source block 23 disposed at the position corresponding to the portion of the sky image 13 is 50% (Line C shown in FIG. 3). The luminance, which is required to display the portion of the ground image 14, is 14%, and hence the luminance level of the light source block 24 disposed at the position corresponding to the portion of the ground image 14 is 25% (Line D shown in FIG. 3). Accordingly, the light source block control data 21 is prepared.

The image processing unit 30 prepares the corrected image data 31 from the luminance level of each of the light source blocks selected as described above and the luminance required to display each of the portions in the image data 11 to be inputted. The expression, which is usable to calculate the gradation level in the corrected image data from the luminance level of the light source block and the luminance required in the image data to be inputted (luminance calculated by Expression 1), is represented by Expression 2 as follows.

Gradation level of corrected image data=(luminance of Expression 1×(1/luminance level))$^{(1/2.2)}$×255 (Expression 2)

For example, the gradation level of the ground image 14 in the inputted image data 11 is 104, the required luminance determined by Expression 1 is 14%, and the luminance level of the light source block 24 disposed at the position corresponding to the portion of the ground image 14 is 25%. Therefore, according to Expression 2, the gradation level of the ground image 34 in the corrected image data 31 is 195. Similarly, the sun image 32 in the corrected image data 31 has the gradation level of 255, the sky image disposed therearound has the gradation level of 184, and the sky image 33 has the gradation level of 252.

The light emission of each of the light source blocks of the backlight 60 is controlled on the basis of the light source block control data 21, and the transmittance of each of the pixels of the LCD module 40 is controlled on the basis of the corrected image data 31. Thus, the liquid crystal display apparatus 1 displays the image based on the input image signal. It is possible to provide the high contrast display by means of the local dimming control in which the luminance of LED is regulated for each of the light source blocks depending on the image data as described above.

Figure 4:
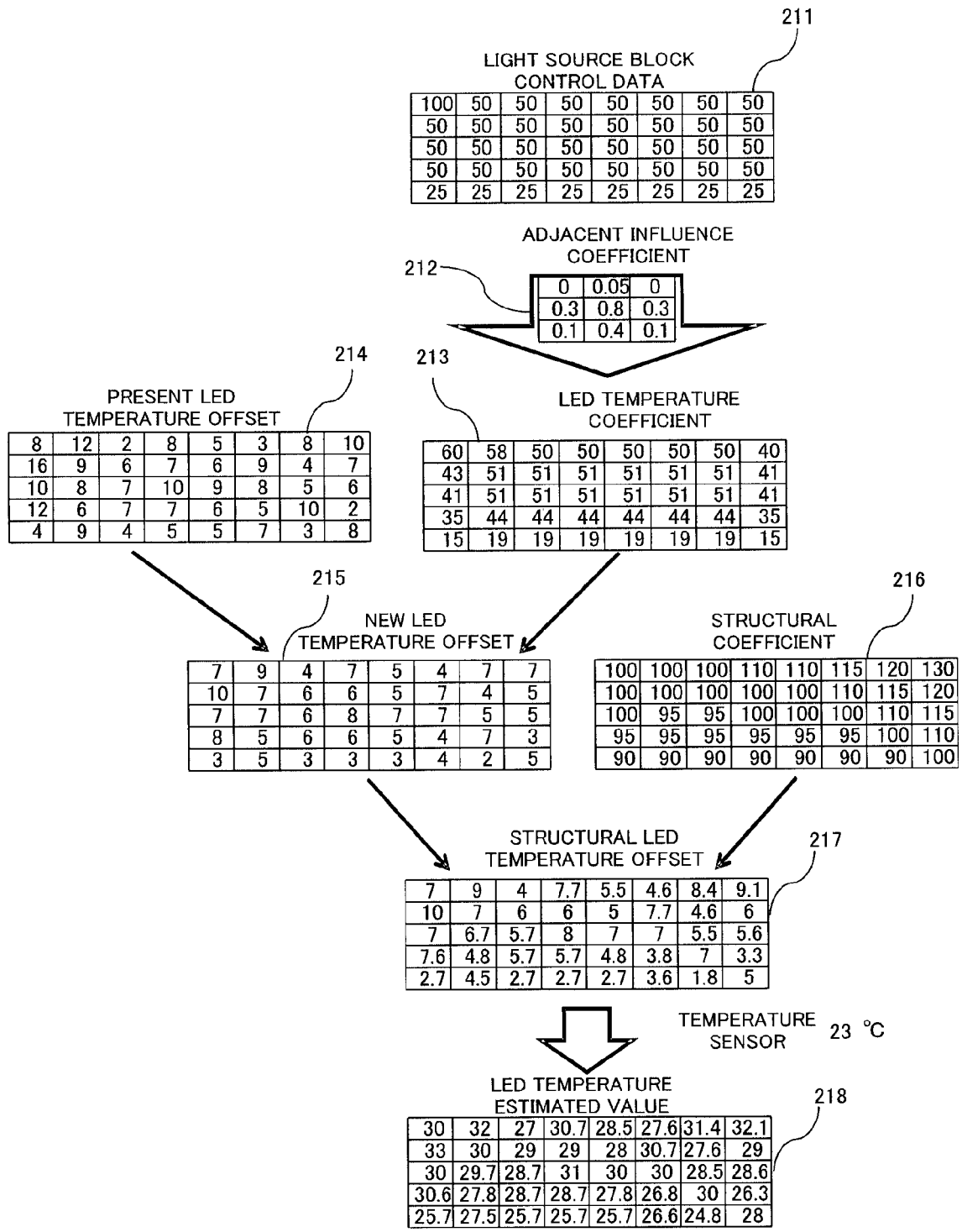
FIG. 4 shows an exemplary calculating process for the LED temperature estimation.

Next, the estimation of the LED temperature will be explained. FIG. 4 conceptually shows an exemplary process performed by the temperature estimating unit 70. The data, in which the light source block control data 21 described above is represented by numerical values, is the light source block control data 211 shown in FIG. 4. In this embodiment, the change of the LED temperature of each of the light source blocks, which is accompanied by the display of the present frame image, is estimated by the temperature estimating unit 70 on the basis of the light source block control data 211.

At first, the temperature estimating unit 70 calculates the LED temperature coefficient 213 from the light source block control data 211 and the adjacent influence coefficient 212. As described above, the light source block control data 211 represents the luminance level of LED of each of the light source blocks. The adjacent influence coefficient 212 is the coefficient which indicates the degree of the influence exerted by the luminances of LEDs of the surrounding light source blocks on the LED temperature of a certain light source block. In this case, the adjacent influence coefficient 212 is stored in the correction table 81 as the coefficient which indicates the degree of the influence exerted by the adjacent eight light source blocks. In the case of this embodiment, the degree of the LED temperature change is estimated for each of the light source blocks while considering the influences exerted by the two light source blocks adjoining in the vertical direction, the two light source blocks adjoining in the lateral direction, and the four light source blocks adjoining in the oblique directions (while sharing the apexes). However, in this embodiment, it is assumed that the influences, which are exerted by the two light source blocks adjoining in the obliquely upward directions of the eight adjoining light source blocks, can be neglected. Therefore, as shown in FIG. 4, the values of the coefficient corresponding to the two adjoining light source blocks in the obliquely upward directions are zero, in relation to the adjacent influence coefficient 212. The LED temperature coefficient 213 represents the way of change of the temperature of LED of the backlight 60 in the image display of the present frame. In the case of such a structure that the degree of diffusion of light of the backlight 60 is low, it is also allowable that the adjacent influence coefficient 212 is not used, because the influence between the adjoining light source blocks is small.

The coefficient $B_{ij}$ of the light source block positioned at the ith position in the vertical direction and the jth position in the lateral direction in relation to the LED temperature coefficient 213 is determined by the following expression.

$$B_{ij} = 0.5 \times \sum_{\substack{m=-1,0,1 \\ n=-1,0,1}} A_{i+m,j+n} K_{mn}$$

In the expression:

$A_{ij}$: luminance level of light source block positioned at ith position in vertical direction and jth position in lateral direction in light source block control data 211. In this embodiment, any one of values of 100%, 75%, 50%, and 25% is provided;

$K_{mn}$: adjacent influence coefficient (m=−1, 0, 1) (n=−1, 0, 1) to represent degree of influence exerted by luminance of LED of light source block separated from certain light source block by m light source blocks in vertical direction and n light source blocks in lateral direction with respect to LED temperature change of certain light source block. In this embodiment, as shown in FIG. 4, $K_{-1,-1}$=0, $K_{0,-1}$=0.3, $K_{1,-1}$=0.1, $K_{-1,0}$=0.05, $K_{0,0}$=0.8, $K_{1,0}$=0.4, $K_{-1,1}$=0, $K_{0,1}$=0.3, $K_{1,1}$=0.1 are provided. However, these values are provided by way of example. Alternatively, it is also allowable to use the adjacent influence coefficient which considers the influence exerted by the light source block separated by two or more light source blocks.

Subsequently, the temperature estimating unit 70 calculates the new LED temperature offset 215 from the LED temperature coefficient 213 calculated as described above and the present LED temperature offset 214. The present LED temperature offset 214 represents the LED temperature of each of the light source blocks (in detail, the offset amount with respect to the temperature detected by the temperature sensor 100) estimated by the temperature estimating unit 70 upon the image display of the previous frame, which is stored in the memory 80. The new LED temperature offset 215 represents the LED temperature offset of each of the light source blocks when the LED of each of the light source blocks is subjected to the light emission in accordance with the image display of the present frame.

In the new LED temperature offset 215, the value $C_{ij}$ of the light source block positioned at the ith position in the vertical direction and the jth position in the lateral direction is determined by means of the following expression.

$$C_{ij} = 0.5 \times D_{ij} + 0.05 \times B_{ij}$$

In the expression, $D_{ij}$ represents the value of the light source block positioned at the ith position in the vertical direction and the jth position in the lateral direction in the present LED temperature offset 214.

The calculated new LED temperature offset 215 is stored in the memory 80. When the new LED temperature offset 215 is stored in the memory 80, the information of the time of the timer 110 is simultaneously stored. The new LED temperature offset 215, which is estimated and stored in relation to the image display of the present frame, is used as the present LED temperature offset 214 described above in the temperature estimation in relation to the image display of the next frame.

Accordingly, it is possible to estimate the way of change of the temperature of the light source block of the backlight 60 in accordance with the image display of the present frame. In this procedure, the temperature estimating unit 70 corrects the new LED temperature offset 215 calculated as described above by using the structural coefficient 216. The structural coefficient 216 is the correction coefficient which is determined by previously measuring the influence exerted by the construction and the structure of the liquid crystal display apparatus 1, which is stored in the correction table 81. The structural coefficient 216 is represented by the percentage.

The temperature estimating unit 70 multiplies the new LED temperature offset 215 by the structural coefficient 216 to determine the structural LED temperature offset 217. In FIG. 4, the LED temperature offset, which is obtained by correcting the new LED temperature offset 215 by using the structural coefficient 216, is shown as the structural LED temperature offset 217. As for the structural coefficient 216 of this embodiment, it is assumed that the waste heat in the liquid crystal display apparatus flows from the lower-left to the upper-right. However, when the value of the coefficient is uniform, for example, owing to the arrangement of the fan, it is also allowable that the table of the structural coefficient 216 is not used.

The value $E_{ij}$ of the light source block positioned at the ith position in the vertical direction and the jth position in the lateral direction in the structural LED temperature offset 217 is determined by means of the following expression.

$$E_{ij}=(C_{ij} \times F_{ij})/100$$

In the expression, $F_{ij}$ represents the value of the light source block positioned at the ith position in the vertical direction and the jth position in the lateral direction in the structural coefficient 216.

The temperature estimating unit 70 reads the measured value obtained by the temperature sensor 100 by means of CPU 90. The structural LED temperature offset 217 calculated as described above is added to the measured value to calculate the LED temperature estimated value 218. Accordingly, it is possible to estimate the temperature of LED in the light source block unit. In the LED temperature estimated value 218, the value $G_{ij}$ of the light source block positioned at the ith position in the vertical direction and the jth position in the lateral direction is determined by means of the following expression.

$$G_{ij}=E_{ij}+G_0$$

In the expression, $G_0$ represents the measured value obtained by the temperature sensor 100. In the example shown in FIG. 4, $G_0=23°$ C. is given. When the temperature sensor is provided at the outside of the casing as in this embodiment, the temperature difference is present between the inside of the casing and the outside of the casing. Therefore, the value $E_{ij}$ of the structural LED temperature offset 217 is added to the measured value $G_0=23°$ C. obtained by the temperature sensor. On the other hand, when the temperature sensor is provided at a specified portion at the inside of the casing, the offset amount, which is provided with respect to the temperature detected by the temperature sensor, is determined as follows. That is, it is assumed that "E" represents the value of the structural LED temperature offset 217 of the light source block corresponding to the position at which the temperature sensor is provided, and the value, which is obtained by subtracting the value E from the value of each of the light source blocks of the structural LED temperature offset 217, is the offset amount with respect to the measured value obtained by the temperature sensor. In this case, the LED temperature estimated value $G_{ij}$ of the light source block positioned at the ith position in the vertical direction and the jth position in the lateral direction is determined by means of the following expression.

$$G_{ij}=(E_{ij}-E)+G_0$$

For example, it is assumed that the light source block, which corresponds to the position of the provision of the temperature sensor, is the light source block (i=3, j=4) disposed at the third position in the downward direction and the fourth position in the rightward direction from the upper-left corer. On this assumption, $E=E_{34}=8$ is given. It is assumed that the measured value obtained by the temperature sensor is $G_0=31°$ C. On this assumption, the LED temperature estimated value $G_{ij}$ of the light source block positioned at the ith position in the vertical direction and the jth position in the lateral direction is the same as the value shown in FIG. 4. The LED temperature estimation in the ordinary state of the liquid crystal display apparatus 1 has been described above.

Next, an explanation will be made about the LED temperature estimation when the power source of the liquid crystal display apparatus 1 is turned ON. Upon the turning ON of the power source, the LED temperature assumption is performed in accordance with a method different from that used in the ordinary state described above. When the power source of the liquid crystal display apparatus 1 is turned ON, the temperature estimating unit 70 acquires the present time from the timer 110 by the aid of CPU 90, and the present time is compared with the time stored in the memory 80 at which the power source was turned OFF at the previous time. The present LED temperature offset 214 stored in the memory is multiplied by the coefficient corresponding to the time difference between the time of the turning ON of the power source and the time stored in the memory 80 by the temperature estimating unit 70, which is used to estimate the LED temperature of each of the light source blocks upon the turning ON of the power source.

In the case of this embodiment, the coefficient is 1 when the time difference is 0 to 10 minutes. The coefficient is 0.5 when the time difference is 10 minutes to 30 minutes. The coefficient is 0.3 when the time difference is 30 minutes to 1 hour. The coefficient is 0.1 when the time difference is 1 hour to 3 hours. The coefficient is 0 when the time difference is not less than 3 hours. In other words, when the elapsed time is short after the power source was turned OFF previously, it is considered that the influence of the LED temperature provided when the power source was turned OFF previously is large. It is noted that the relationship between the time difference and the coefficient and the value of the coefficient differ depending on the construction (arrangement) and the structure of the liquid crystal display apparatus.

The correcting unit 130 corrects the preset value of the luminance of LED of each of the light source blocks brought about by the backlight driving unit 50 depending on the LED temperature of each of the light source blocks estimated by the temperature estimating unit 70 as described above. For example, the correcting unit 130 corrects the preset value of the luminance of LED of each of the light source blocks so that the dispersion of the luminance of each of the light source blocks is suppressed, from the temperature characteristic of the luminance of LED previously stored and the estimated value of the LED temperature of each of the light source blocks. Alternatively, the correlation between the LED temperature of the light source block and the correction amount to correct the luminance of LED is previously stored on the basis of the temperature characteristic of the luminance of LED. The correcting unit 130 corrects the preset value of the luminance of LED for each of the light source blocks on the basis of the correlation stored by the correction amount storage and the estimated value of the LED temperature of each of the light source blocks. Accordingly, even when any dispersion arises in the temperature of the light source block on account of the local dimming control, it is possible to suppress the dispersion of the luminance of each of the light source blocks.

The correcting unit 130 corrects the transmittance of each of the pixels brought about by the LED module 40 depending on the LED temperature of each of the light source blocks estimated by the temperature estimating unit 70. For example, the correcting unit 130 corrects the transmittance of the pixel corresponding to each of the light source blocks so that the dispersion of the color temperature of each of the light source blocks is suppressed, from the temperature characteristic of the light emission wavelength of LED previously stored and the estimated value of the LED temperature of each of the light source blocks. Alternatively, the correlation between the LED temperature of the light source block and the correction amount to correct the image data is previously stored on the basis of the temperature characteristic of the light emission wavelength of LED. The correcting unit 130 corrects the image data of the area corresponding to each of the light source blocks on the liquid crystal panel on the basis of the correlation stored by the correction amount storage and the estimated value of the LED temperature of each of the light source blocks. Accordingly, even when any dispersion arises in the temperature of the light source block on account of the local dimming control, it is possible to suppress the dispersion of the color temperature (white balance) for each of the areas corresponding to the light source blocks.

Therefore, according to the liquid crystal display apparatus 1 of this embodiment, it is possible to suppress the dispersion of the luminance and the color temperature for each of the light source blocks in the liquid crystal display apparatus for performing the local dimming control without providing the temperature sensor and the optical sensor for each of the light source blocks. Therefore, it is possible to suppress the increase in the number of installed sensors and it is possible to suppress the increase in the cost.

Modified Embodiment of First Embodiment

The first embodiment is illustrative of the exemplary case in which the temperature estimating unit 70 performs the process of the temperature estimation for each of the frames. However, for example, when the still image is displayed or when the temperature change is small, then it is inefficient to perform the temperature estimation process for each of the frames. Therefore, a mechanism is added, in which the process of the temperature estimation is stopped when the light source block control data 211 is unchanged and the value of the temperature sensor 100 is unchanged. Accordingly, it is possible to reduce the load on the calculating process.

An explanation will be made below about parts or portions different from those of the first embodiment. The operation, which is performed when the light source block control data 211 is unchanged, for example, when a still image is displayed, will be explained with reference to FIG. 4.

When the light source block control data 211 is unchanged, and the value of the temperature sensor 100 is unchanged, then the structural LED temperature offset 217 gradually converges on the value corresponding to the light source block control data 211 (for example, the structural LED temperature offset 217 converges when the temperature estimating process is performed in an amount corresponding to about 20 frames). Therefore, when the value of the temperature sensor 100 is unchanged and the change of the light source block control data 211 between the frames is continuously zero a predetermined number of times, then the temperature estimating unit 70 stops the temperature estimating process. When the change of the light source block control data 211 between the frames is detected, the temperature estimating unit 70 restarts the temperature estimating process.

When the value of the temperature sensor 100 is changed during the period in which the temperature estimating process is stopped, the estimated temperature is determined merely by calculating the LED temperature estimated value 218 from the value of the structural LED temperature offset 217 and the temperature detected by the temperature sensor 100.

Second Embodiment

Figure 5:
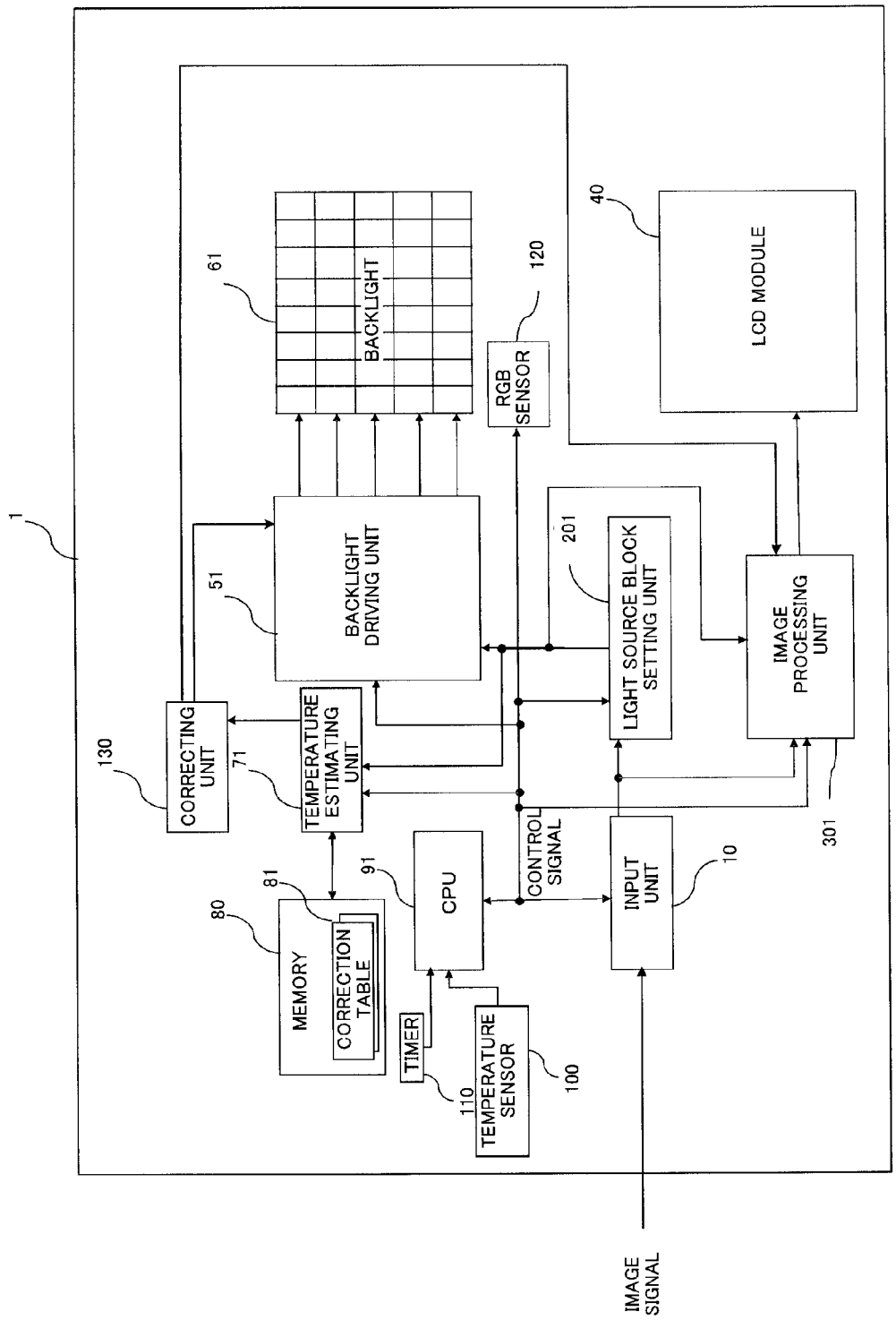
FIG. 5 shows an entire arrangement of a liquid crystal display apparatus of a second embodiment.

A second embodiment will be specifically explained below with reference to FIG. 5. If the reference numerals in FIG. 5 used in the second embodiment are the same as the reference numerals in FIG. 1 used in the first embodiment, the function and the operation are identical with each other. The functional units, which are not specifically referred to in the second embodiment, have the same function and the same operation as those of the first embodiment.

In a liquid crystal display apparatus 1 of this embodiment, a backlight 61 is constructed by a set of red LEDs, green LEDs, and blue LEDs for which the light emission can be controlled independently. One light source block is constructed by one set or a plurality of sets of red LEDs, green LEDs, and blue LEDs. The ratio of the numbers of the respective color LEDs for constructing the backlight 61 is red LEDs: green LEDs:blue LEDs=1:2:1.

A light source block setting unit 201 prepares the light source block control data to indicate the luminance of each of color LEDs of each of the light source blocks of the backlight 61 on the basis of the image data supplied from the input unit 10, and the data is sent to an image processing unit 301, a backlight driving unit 51, and the temperature estimating unit 70. In the case of this embodiment, the backlight 61 is constructed by a set of red LEDs, green LEDs, and blue LEDs for which the light emission can be controlled independently. Therefore, the light source block setting unit 201 prepares the light source block control data of each of the colors of red, green, and blue on the basis of the maximum gradation level of each of the colors of red, green, and blue of the image data for each of the areas corresponding to the respective light source blocks of the backlight 61.

The image processing unit 301 corrects the gradation level of each of the colors of red, green, and blue of the image data supplied from the input unit 10 on the basis of the light source block control data for each of the colors of red, green, and blue supplied from the light source block setting unit 201 to generate the corrected image data of each of the colors, and the data is sent to the LCD module 40. The LCD module 40 is controlled in accordance with the corrected image data.

CPU 91 controls the temperature sensor 100, the timer 110, and an RGB sensor 120 as well as various functional units. The backlight driving unit 51 causes the light emission at the designated luminance for LEDs of each of the colors of the respective light source blocks of the backlight 61 on the basis of the control information supplied from CPU 91 and the light source block control data supplied from the light source block setting unit 201.

A temperature estimating unit 71 estimates the temperature of LED of the backlight 61 for each of the light source blocks on the basis of the light source block control data supplied from the light source block setting unit 201 and the correction table 81 stored in the memory 80.

The RGB sensor 120 detects the luminance and the color information of the backlight 61. The RGB sensor 120 is the sensor which is capable of detecting the colors of red, green, and blue. The balance among red, green, and blue can be detected for the backlight 61 by the RGB sensor 120. In general, the time-dependent deterioration of LED differs depending on the color. However, it is possible to confirm the deterioration of each of the colors by using the RGB sensor 120.

Next, an explanation will be made with reference to the drawings about the detailed flow of the operation. The following explanation will be made as exemplified by such an exemplary case that an image signal of a landscape image composed of a sun image, a sky image, and a ground image is inputted into the liquid crystal display apparatus 1. The following process is carried out for each of the inputted frame images.

Figure 6:
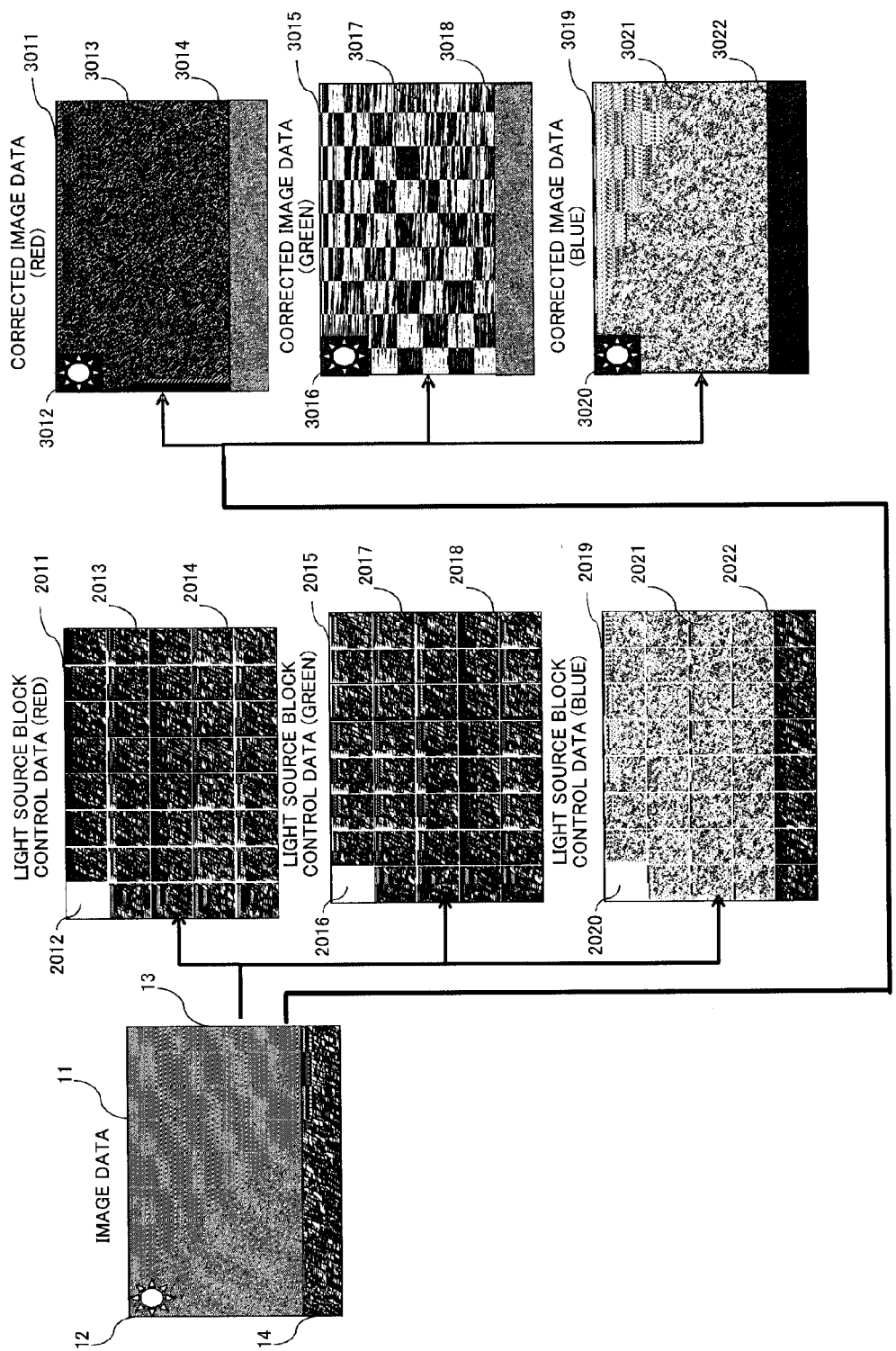
FIG. 6 shows images concerning the process for the light source block control data and the corrected image data.

FIG. 6 conceptually shows the image data of one frame of the image signal received by the input unit 10, the light source block control data prepared by the light source block setting unit 201, and the corrected image data prepared by the image processing unit 301. The luminance of the display image on the LCD module 40 is determined by the gradation level of the corrected image data and the luminance of each of the light source blocks of the backlight 61.

With reference to FIG. 6, the inputted image data 11 includes the sun image 12, the blue sky image 13, and the ground image 14. The light source block setting unit 201 prepares the light source block control data (red) 2011, the light source block control data (green) 2014, the light source block control data (blue) 2018, the corrected image data (red) 3011, the corrected image data (green) 2015, and the corrected image data (blue) 3019 on the basis of the image data. This process will be explained.

The light source block setting unit 201 determines the maximum gradation level of each of the colors of red, green, and blue of the image data 11 for each of the areas corresponding to the respective light source blocks of the backlight 61.

In the example shown in FIG. 6, it is assumed that the maximum gradation levels of the respective portions of the image data 11 are represented as follows when the maximum gradation levels are expressed in a form of (red, green, blue). That is, the maximum gradation levels of the portion of the sun image 12 are represented by (255, 255, 255), the maximum gradation levels of the portion of the sky image 13 are represented by (27, 27, 184), and the maximum gradation levels of the portion of the ground image 14 are represented by (104, 65, 44).

Subsequently, the light source block setting unit 201 calculates the luminance corresponding to the determined maximum gradation level for each of the colors. The correlation or relationship, which is depicted by Solid line A shown in FIG. 3, is used for the correlation between the maximum gradation level of the image data and the luminance in the same manner as in the first embodiment. In general, in the case of the liquid crystal display apparatus, the relationship between the input gradation level and the luminance is not proportional, and the relationship has the so-called gamma characteristic. The light source block setting unit 201 applies Expression 1 explained in the first embodiment to each of the colors as the expression for calculating the luminance from the gradation level of the image data.

In the example of the image data 11 shown in FIG. 6, it is assumed that the luminances of the backlight required to display the respective portions are represented as follows when the luminances are expressed in a form of (red, green, blue). That is, the luminances required to display the sun image 12 are represented by (100%, 100%, 100%), the luminances required to display the sky image 13 are represented by (0.007%, 0.007%, 48%), and the luminances required to display the ground image 14 are represented by (14%, 0.049%, 0.02%).

Subsequently, the light source block setting unit 201 prepares the light source block control data (red) 2011, the light source block control data (green) 2015, and the light source block control data (blue) 2019. For this purpose, the luminance level of each of the light source blocks of the backlight 61 is selected from the four levels shown in FIG. 3 for each of the colors in the same manner as in the first embodiment. In this case, it is assumed that the luminance of each of the colors of each of the light source blocks of the backlight 61 can be regulated to anyone of the luminances at the four levels. The light source block setting unit 201 determines the luminance level of each of the colors of each of the light source blocks in accordance with the luminance of each of the colors required to display the respective portions of the image data 11 determined as described above. Specifically, the light source block setting unit 201 selects the minimum luminance level of not less than the luminance required to display the concerning portion as the luminance level of the light source block corresponding to each of the portions of the image data 11 for each of the colors.

The luminance of the red color required to display the portion of the sun image 12 is 100%, and hence the light source block setting unit 201 selects 100% for the luminance level of the red light source block 2012 disposed at the position corresponding to the portion of the sun image 12. The luminance of the red color required to display the portion of the sky image 13 is 0.007%, and hence the light source block setting unit 201 selects 25% for the luminance level of the red light source block 2013 disposed at the position corresponding to the portion of the sky image 13. The luminance of the red color required to display the portion of the ground image 14 is 14%, and hence the light source block setting unit 201 selects 25% for the luminance level of the red light source block 2014 disposed at the position corresponding to the portion of the ground image 14. According to the foregoing procedure, the light source block control data (red) 2011 is prepared.

The luminance of the green color required to display the portion of the sun image 12 is 100%, and hence the light source block setting unit 201 selects 100% for the luminance level of the green light source block 2016 disposed at the position corresponding to the portion of the sun image 12. The luminance of the green color required to display the portion of the sky image 13 is 0.007%, and hence the light source block setting unit 201 selects 25% for the luminance level of the green light source block 2017 disposed at the position corresponding to the portion of the sky image 13. The luminance of the green color required to display the portion of the ground image 14 is 0.049%, and hence the light source block setting unit 201 selects 25% for the luminance level of the green light source block 2018 disposed at the position corresponding to the portion of the ground image 14. According to the foregoing procedure, the light source block control data (green) 2015 is prepared.

The luminance of the blue color required to display the portion of the sun image 12 is 100%, and hence the light source block setting unit 201 selects 100% for the luminance level of the blue light source block 2020 disposed at the position corresponding to the portion of the sun image 12. The luminance of the blue color required to display the portion of the sky image 13 is 48%, and hence the light source block setting unit 201 selects 50% for the luminance level of the blue light source block 2021 disposed at the position corresponding to the portion of the sky image 13. The luminance of the blue color required to display the portion of the ground image 14 is 0.02%, and hence the light source block setting unit 201 selects 25% for the luminance level of the blue light source block 2022 disposed at the position corresponding to the portion of the ground image 14. According to the foregoing procedure, the light source block control data (blue) 2019 is prepared.

The image processing unit 301 prepares the corrected image data for each of the colors from the luminance level of each of the colors for each of the light source blocks selected as described above and the luminance of each of the colors required to display each of the portions in the image data 11 to be inputted. The expression, which is used to calculate the gradation level in the corrected image data of each of the colors from the luminance level of each of the colors of the light source block and the luminance required for each of the colors in the image data to be inputted (luminance calculated by Expression 1), is the same as Expression 2 explained in the first embodiment. The image processing unit 301 generates the corrected image data for each of the colors of red, green, and blue.

In the corrected image data (red) 3011, the gradation level of the sun image 3012 is 255, the gradation level of the surrounding sky is 27, the gradation level of the sky image 3013 is 50, and the gradation level of the ground image 3014 is 195. In the corrected image data (green) 3015, the gradation level of the sun image 3016 is 255, the gradation level of the surrounding sky is 27, the gradation level of the sky image 3017 is 50, and the gradation level of the ground image 3018 is 122. In the corrected image data (blue) 3019, the gradation level of the sun image 3020 is 255, the gradation level of the surrounding sky is 184, the gradation level of the sky image 3021 is 252, and the gradation level of the ground image 3022 is 83.

The light emission of LEDs of each of the colors of each of the light source blocks of the backlight 61 is controlled on the basis of the light source block control data (red) 2011, the light source block control data (green) 2015, and the light source block control data (blue) 2019. Further, the transmittance of each of the pixels of the LCD module 40 is controlled on the basis of the corrected image data (red) 3011, the corrected image data (green) 3015, and the corrected image data (blue) 3019. Accordingly, the liquid crystal display apparatus 1 displays the image based on the input image signal. It is possible to perform the display at the high contrast in accordance with the local dimming control in which the luminance of LEDs of each of the colors is regulated for each of the light source blocks in accordance with the image data as described above.

FIG. 6 is depicted while making the division into those of the red color, the green color, and the blue color for the purpose of explanation. However, they are arranged while being aligned on the same plane in the construction or arrangement of the backlight 61.

Figure 7:
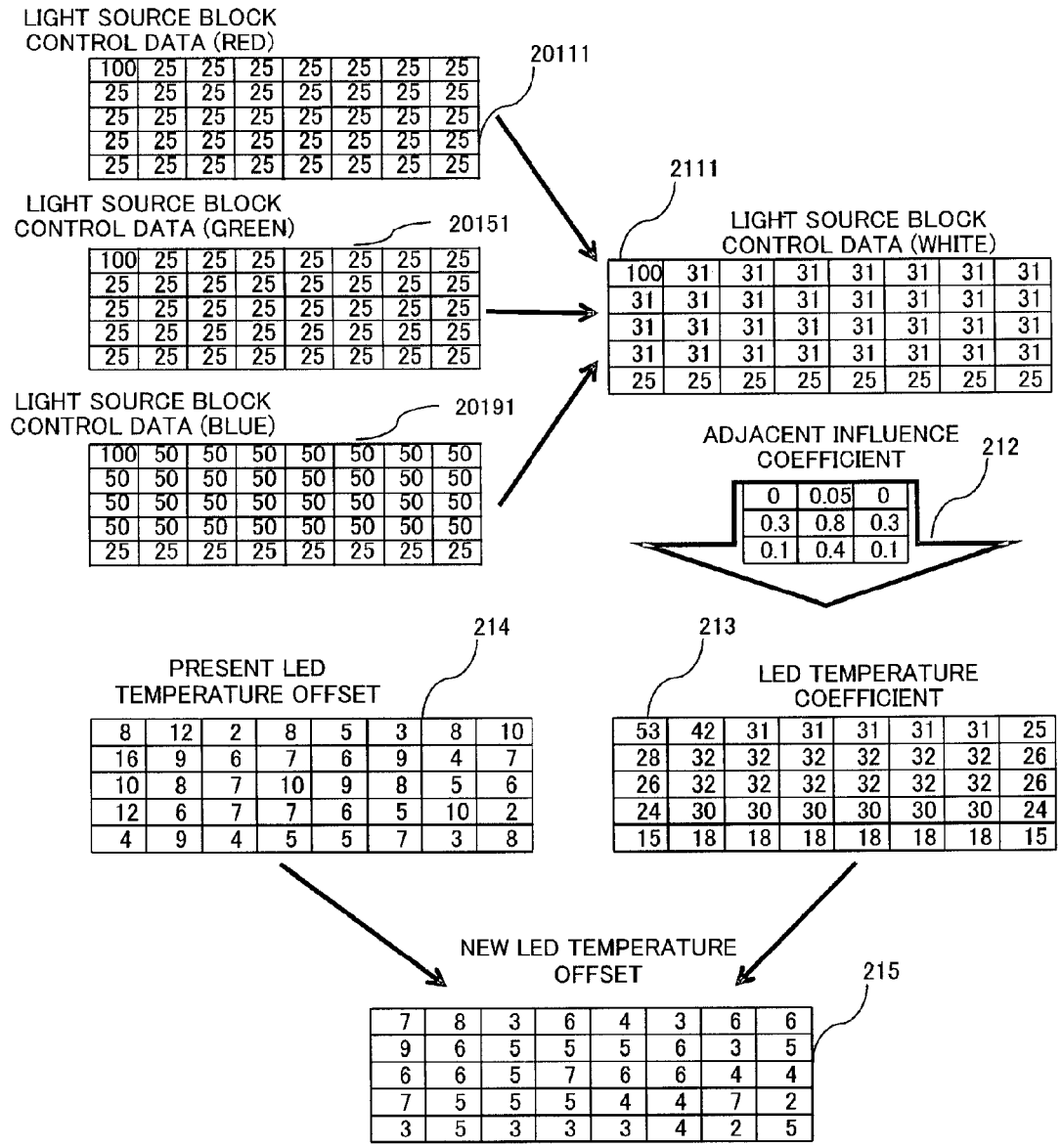
FIG. 7 shows an exemplary calculating process for the LED temperature estimation.

FIG. 7 shows a process performed by the temperature estimating unit 71. With reference to FIG. 7, the light source block control data (red) 2011 is represented by numerical values to provide the light source block control data (red) 20111, the light source block control data (green) 2015 is represented by numerical values to provide the light source block control data (green) 20151, and the light source block control data (blue) 2019 is represented by numerical values to provide the light source block control data (blue) 20191.

In this embodiment, the backlight 61 is comparted into the plurality of light source blocks by means of the same method for LEDs of the respective colors. LEDs of the respective colors are arranged in each of the light source blocks so that red LED:green LED:blue LED=1:2:1 is given as the ratio concerning the number of LEDs. The light source block control data (white) 2111 is provided by performing the addition while weighting the light source block control data (red) 20111, the light source block control data (green) 20151, and the light source block control data (blue) 20191 depending on the ratio concerning the number of LEDs.

Therefore, in the arrangement of this embodiment, the value Wij of the light source block positioned at the ith position in the vertical direction and the jth position in the lateral direction in the light source block control data (white) 2111 is calculated by the following expression.

$$Wij = 0.25 \times Rij + 0.5 \times Gij + 0.25 \times Bij$$

In the expression:
Rij: value of light source block positioned at ith position in vertical direction and jth position in lateral direction in light source block control data (red) 20111;
Gij: value of light source block positioned at ith position in vertical direction and jth position in lateral direction in light source block control data (green) 20151;
Bij: value of light source block positioned at ith position in vertical direction and jth position in lateral direction in light source block control data (blue) 20191.

The temperature estimating unit 71 estimates the temperatures of LEDs of the backlight 61 for the respective light source blocks by performing the same process as the process explained in the first embodiment, on the basis of the light source block control data (white) 2111.

According to the liquid crystal display apparatus 1 of this embodiment, it is unnecessary to provide the temperature sensor for each of the light source blocks. It is possible to estimate the temperatures of LEDs in relation to the unit of the light source block, and it is possible to estimate the dispersion of the LED temperatures for each of the light source blocks. The correction is carried out for the color deviation of the display caused by the temperature change of LED, in accordance with the estimated LED temperature of each of the light source blocks. Thus, it is possible to appropriately suppress the unevenness of the luminance and the color balance in the liquid crystal display apparatus for performing the local dimming control.

Although not shown, an optical member, which includes, for example, a light diffusion plate and a polarizing sheet to uniformize the light of LED, is installed for the backlight 60 and/or between the backlight 61 and the LCD module 40.

The backlight 60 is composed of white LEDs. The backlight 61 is composed of three color LEDs of red LEDs, green LEDs, and blue LEDs. However, it is also possible to use a backlight composed of four color LEDs of white LEDs, red LEDs, green LEDs, and blue LEDs as well as LEDs of any other color. The light source of the backlight is not limited to LEDs, which may be, for example, a cold cathode fluorescent lamp (CCFL) (cold cathode discharge tube). According to the present invention, it is possible to estimate the temperature of the light source of each of the light source blocks in relation to all types of backlights capable of performing the local dimming control, provided with any light source having the temperature dependency of the light emission characteristic including, for example, the wavelength and the luminance. The function and the effect as described above can be obtained to suppress the uneven luminance and the deviation of the color balance by correcting the image data for each of the areas corresponding to the light source blocks and the luminance of the light source of each of the light source blocks on the basis of the estimated temperature.

Both of the relationship between the gradation level of the input image and the luminance and the relationship between the gradation level of the image data displayed by the LCD module 40 and the luminance are the relationships raised to the power of 2.2. However, if any difference arises, the conversion is performed by means of the input unit 10 to obtain the relationship between the gradation level of the image data displayed by the LCD module 40 and the luminance. The relationship between the gradation level of the image data displayed by the LCD module 40 and the luminance changes depending on the LCD module 40.

In the embodiment described above, the luminance required for the concerning light source block is determined by using Line A of 100% shown in FIG. 3 from the maximum gradation level of the image data in the area corresponding to each of the light source blocks. However, it is also allowable that any other reference line is provided, and the necessary luminance is determined on the basis thereof.

In the embodiment described above, the luminance levels of the light source block of the backlight are the four levels in order to simplify the explanation. However, it is also allowable to adopt any other number of levels. The image data, which is inputted into the input unit and the LCD module, resides in 8 bit. However, it is also allowable to adopt any other bit number.

In FIG. 4, for example, the value of the adjacent influence coefficient 212 to be used when the LED temperature coefficient 213 is determined from the light source block control data 211 and the number of adjoining light source blocks to cause the influence differ depending on the arrangement and the structure of the display apparatus. The new LED temperature offset 215 is determined by adding ½ of the value of the present LED temperature offset 214 and ½₀ of the value of the LED temperature coefficient 213. However, the calculating method differs depending on the arrangement and the structure of the image display apparatus. The structural coefficient 216 is represented by the percentage, by which the new LED temperature offset 215 is multiplied to determine the structural LED temperature offset 217. However, the value of the structural coefficient and the calculation expression may differ depending on the arrangement and the structure of the image display apparatus. The simple offset relationship is provided for the measured value obtained by the temperature sensor and the LED temperature estimated value 218. However, any different relationship is provided between the both in some cases on account of the arrangement and the structure of the image display apparatus. The example, in which the LED temperature offset stored in the memory 80 is multiplied by the coefficient corresponding to the time difference from the previous turning OFF of the power source, has been explained as the example of the control performed in the initial state of the turning ON of the power source of the liquid crystal display apparatus. However, it is also allowable that the calculating method for calculating dispersion of the LED temperature in the initial state of the turning ON of the power source differs depending on the arrangement and the structure of the liquid crystal display apparatus.

The ratio concerning the number of LEDs included in the light source blocks of the backlight 61 of the second embodiment is "red LED:green LED:blue LED=1:2:1". However, it is also allowable to adopt any other different ratio. The explanation has been made about the exemplary case in which the light source block control data (white) is determined by using, as the weighting coefficient, the same value as the ratio concerning the number of LEDs. However, it is also allowable to make any change in order to perform the correction on account of the deterioration and/or the condition of the display of the color balance including, for example, the color temperature setting of the white color.

Third Embodiment

The first embodiment is illustrative of the exemplary case in which the temperature is estimated by using the value of the light source block control data 211 as the luminance value of the light source of the light source block. This third embodiment is illustrative of such an exemplary case that a detected value, which is supplied from an optical sensor contained in a backlight 62, is used as the luminance value of the light source of the light source block, without using the light source block control data 211.

Figure 8:
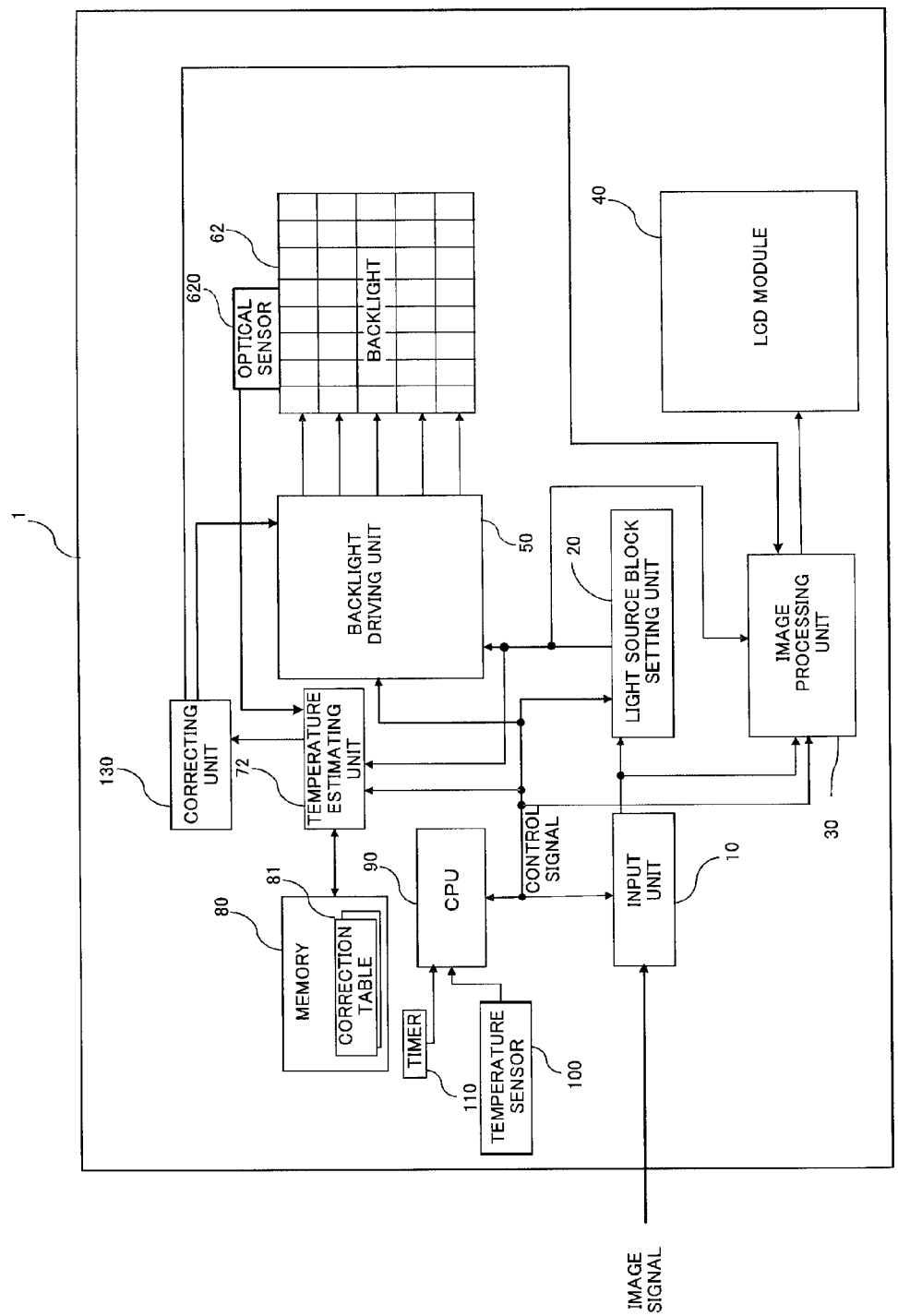
FIG. 8 shows an entire arrangement of a liquid crystal display apparatus of a third embodiment.

The third embodiment will be specifically explained below with reference to FIG. 8. If the reference numerals in FIG. 8 used in the third embodiment are the same as the reference numerals in FIG. 1 used in the first embodiment, the function and the operation are identical with each other. It is assumed that the functional units, which are not specifically referred to in the third embodiment, have the same function and the same operation as those of the first embodiment.

The optical sensor 620, which detects the luminance of the backlight 62, is contained in the backlight 62. The backlight luminance data, which is the data of the measured value obtained by the optical sensor 620, is sent from the optical sensor 620 to a temperature estimating unit 72.

Figure 9:
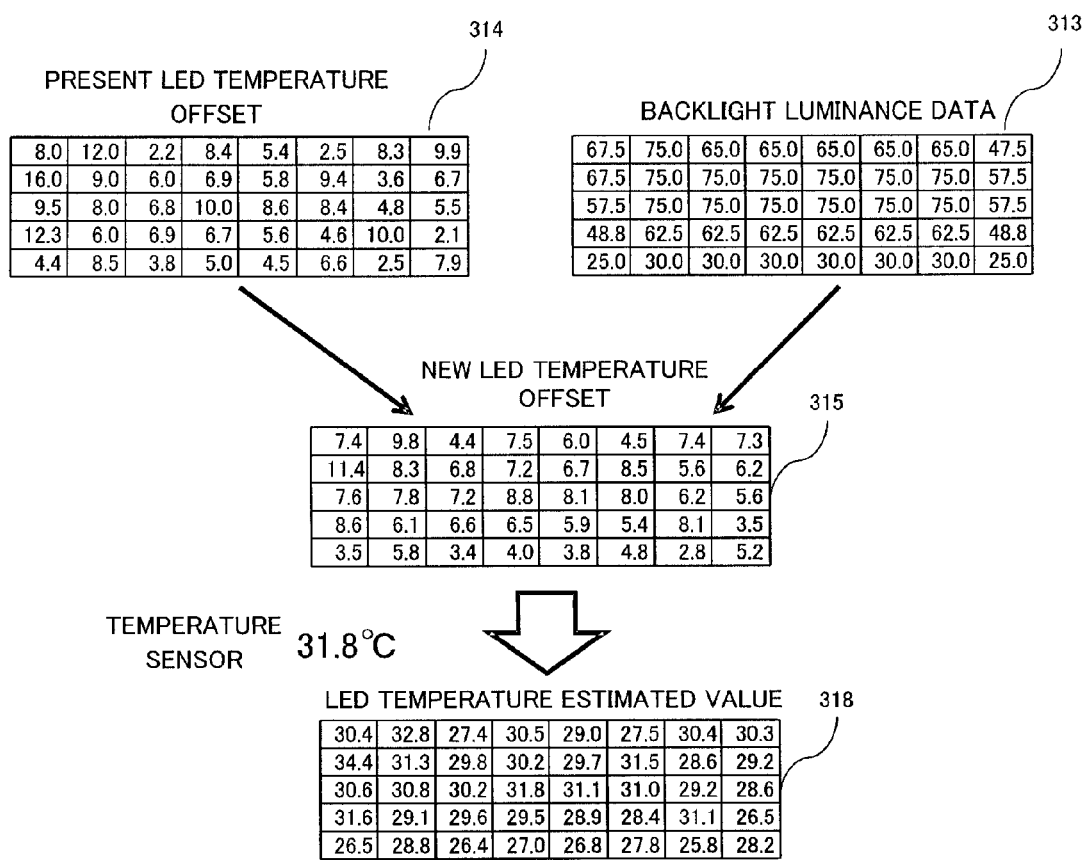
FIG. 9 shows an exemplary calculating process for the LED temperature estimation based on the use of an optical sensor.

An explanation will be made with reference to FIG. 9 about the operation of the temperature estimating unit 72 which has received the backlight luminance data from the optical sensor 620. In FIG. 9, the backlight luminance data 313 resides in detected values of a plurality of optical sensors provided to correspond to the plurality of light source blocks for constructing the backlight 62. The optical sensor, which is provided for each of the light source blocks, detects the luminance which also includes the diffused light from the adjacent light source block. Therefore, it is possible to omit the calculating process based on the use of the adjacent influence coefficient 212 explained in the first embodiment.

The calculating process, in which the new LED temperature offset 315 is calculated from the backlight luminance data 313 and the present LED temperature offset 314, is the same as or equivalent to the calculating process in which the new LED temperature offset 215 is calculated from the present LED temperature offset 214 and the LED temperature coefficient 213 in the first embodiment. In this procedure, the temperature estimating unit 72 does not perform the correction of the new LED temperature offset by using the structural coefficient 216 explained in the first embodiment. The temperature estimating unit 72 calculates the LED temperature estimated value 318 from the new LED temperature offset 315. The temperature sensor 100 may be provided either outside the casing or inside the casing as explained in the first embodiment.

In this case, it is assumed that the temperature sensor 100 is provided at the inside of the casing (for example, at a position disposed at the third light source block in the downward direction and the fourth light source block in the rightward direction from the upper-left corner). In this arrangement, as explained in the first embodiment, the value E ($=E_{34}=8.8$) of the light source block corresponding to the position ($i=3, j=4$) at which the temperature sensor 100 is provided in relation to the new LED temperature offset 315 is subtracted from each of the values of the new LED temperature offset 315. The value, which is determined by performing the subtraction, is used as the offset amount with respect to the measured value obtained by the temperature sensor 100. That is, assuming that the measured value obtained by the temperature sensor 100 is $G_0$, the LED temperature estimated value $G_{ij}$ of the light source block positioned at the ith position in the vertical direction and the jth position in the lateral direction is determined by means of the following expression.

$$G_{ij}=(E_{ij}-E)+G_0$$

For example, if the measured value $G_0=31.8°$ C. is obtained by the temperature sensor 100, the determined LED temperature estimated value 318 has the values shown in FIG. 9.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-098657, filed on Apr. 26, 2011, and Japanese Patent Application No. 2012-038827, filed on Feb. 24, 2012, which are hereby incorporated by reference herein in their entirety.

What is claimed is:

1. A temperature estimating apparatus for a backlight including a plurality of light source blocks each having one light source or a plurality of light sources and in which light emission of the light source of each of the light source blocks can be regulated independently, the temperature estimating apparatus comprising:
    an acquiring unit which acquires a luminance of the light source for each of the light source blocks;
    a temperature sensor which measures a temperature of at least any one of an internal temperature of a casing and an external temperature of the casing of the image display apparatus having the backlight;
    an estimating unit which estimates a temperature of the light source for each of the light source blocks on the basis of a measured value obtained by the temperature sensor and a luminance value of the light source of each of the light source blocks acquired by the acquiring unit; and
    a storage unit which previously stores an adjacent influence coefficient to indicate a degree of an influence exerted on the temperature of the light source of the certain light source block by the luminances of the light sources of surrounding light source blocks of the light source block, wherein:
    the estimating unit estimates the temperature of the light source of each of the light source blocks on the basis of the luminance value of the light source of the concerning light source block, the luminance values of the light sources of the surrounding light source blocks disposed around the concerning light source block, and the adjacent influence coefficient.

2. The temperature estimating apparatus according to claim 1, wherein:
    the storage unit stores the temperature of the light source of each of the light source blocks estimated by the estimating unit; and
    the estimating unit estimates a temperature change of the light source of each of the light source blocks caused by display of image data of a present frame in accordance with the image data of the present frame, and the estimating unit estimates the temperature of the light source of each of the light source blocks to be brought about when the image data of the present frame is displayed, on the basis of the estimated temperature change and the temperature of the light source of each of the light source blocks estimated in accordance with image data of a previous frame stored in the storage unit.

3. The temperature estimating apparatus according to claim 1, wherein:
    the storage unit previously stores a structural coefficient which indicates a degree of an influence exerted by a structure of the backlight on the temperature of the light source of each of the light source blocks; and
    the estimating unit estimates the temperature of the light source of each of the light source blocks on the basis of the structural coefficient as well.

4. The temperature estimating apparatus according to claim 1, further comprising:
    a setting unit which sets the luminance of the light source for each of the light source blocks depending on image data to be inputted, wherein:
    the acquiring unit acquires a set value brought about by the setting unit as the luminance of the light source of each of the light source blocks.

5. An image display apparatus comprising:
    the temperature estimating apparatus as defined in claim 1;
    a liquid crystal panel;
    the backlight including a plurality of light source blocks each having one light source or a plurality of light sources, in which light emission of the light source of each of the light source blocks can be regulated independently, and which radiates light onto the liquid crystal panel;
    a setting unit which sets the luminance of the light source for each of the light source blocks in accordance with image data to be inputted;
    a correction amount storage unit which stores a correlation between the temperature of the light source of the light source block and a correction amount for correcting a set value of the luminance of the light source of the light source block set by the setting unit; and
    a correcting unit which corrects the set value of the luminance of the light source of each of the light source blocks set by the setting unit, on the basis of the correlation and the temperature of the light source of each of the light source blocks estimated by the temperature estimating apparatus.

6. The image display apparatus according to claim 5, wherein:
    the correction amount storage unit stores a correlation between the temperature of the light source of the light source block and a correction amount for correcting the image data to be inputted; and
    the correcting unit corrects the image data displayed in each area on the liquid crystal panel corresponding to each of the light source blocks, on the basis of the correlation and the temperature of the light source of each of the light source blocks estimated by the temperature estimating apparatus.

7. A temperature estimating apparatus for a backlight including a plurality of light source blocks each having one light source or a plurality of light sources and in which light emission of the light source of each of the light source blocks can be regulated independently, the temperature estimating apparatus comprising:
    an acquiring unit which acquires a luminance of the light source for each of the light source blocks;
    a temperature sensor which measures a temperature of at least any one of an internal temperature of a casing and an external temperature of the casing of the image display apparatus having the backlight;
    an estimating unit which estimates a temperature of the light source for each of the light source blocks on the basis of a measured value obtained by the temperature sensor and a luminance value of the light source of each of the light source blocks acquired by the acquiring unit; and a plurality of optical sensors which measure the respective luminances of the plurality of light source blocks, wherein:

the acquiring unit acquires a measured value obtained by the optical sensor as the luminance of the light source of each of the light source blocks.

8. A method for controlling a temperature estimating apparatus for a backlight including a plurality of light source blocks each having one light source or a plurality of light sources and in which light emission of the light source of each of the light source blocks can be regulated independently, the method comprising:

an acquiring step of acquiring a luminance of the light source for each of the light source blocks;

a step of acquiring a measured value from a temperature sensor which measures a temperature of at least any one of an internal temperature of a casing and an external temperature of the casing of the image display apparatus having the backlight;

an estimating step of estimating a temperature of the light source for each of the light source blocks on the basis of the measured value obtained by the temperature sensor and a luminance value of the light source of each of the light source blocks acquired in the acquiring step; and a step of acquiring from a storage unit an adjacent influence coefficient to indicate a degree of an influence exerted on the temperature of the light source of the certain light source block by the luminances of the light sources of surrounding light source blocks of the light source block, wherein:

in the estimating step, the temperature of the light source of each of the light source blocks is estimated on the basis of the luminance value of the light source of the concerning light source block, the luminance values of the light sources of the surrounding light source blocks disposed around the concerning light source block, and the adjacent influence coefficient.

9. A method for controlling a temperature estimating apparatus for a backlight including a plurality of light source blocks each having one light source or a plurality of light sources and in which light emission of the light source of each of the light source blocks can be regulated independently, the method comprising:

an acquiring step of acquiring a luminance of the light source for each of the light source blocks;

a step of acquiring a measured value from a temperature sensor which measures a temperature of at least any one of an internal temperature of a casing and an external temperature of the casing of the image display apparatus having the backlight;

an estimating step of estimating a temperature of the light source for each of the light source blocks on the basis of the measured value obtained by the temperature sensor and a luminance value of the light source of each of the light source blocks acquired in the acquiring step; and a step of acquiring measured values from a plurality of optical sensors which measures the respective luminances of the plurality of light source blocks, wherein in the acquiring step, the measured value obtained by the optical sensor as the luminance of the light source of each of the light source blocks.

\* \* \* \* \*